United States Patent [19]

Asakura

[11] Patent Number: 4,778,272

[45] Date of Patent: Oct. 18, 1988

[54] APPARATUS FOR DETECTING A DOCUMENT SIZE IN A COPIER AND OTHERS

[75] Inventor: Koichi Asakura, Tokyo, Japan

[73] Assignee: Ricoh Company, Ltd., Tokyo, Japan

[21] Appl. No.: 932,863

[22] Filed: Nov. 20, 1986

[30] Foreign Application Priority Data

Nov. 25, 1985 [JP] Japan .................. 60-264472
Nov. 25, 1985 [JP] Japan .................. 60-264473

[51] Int. Cl.⁴ .......................................... G01N 21/55
[52] U.S. Cl. .................................... 356/372; 250/560
[58] Field of Search ............... 356/372, 379, 383, 387;
250/560, 561; 355/14 SH

[56] References Cited

U.S. PATENT DOCUMENTS

| 4,555,180 | 11/1985 | Masuda et al. | 356/445 |
| 4,564,290 | 1/1986 | Bell et al. | 356/380 X |
| 4,585,332 | 4/1986 | Shenoy | 355/145 HX |
| 4,681,455 | 7/1987 | Jeschke et al. | 356/380 X |

FOREIGN PATENT DOCUMENTS 0095367 6/1983 Japan .................. 355/145 H

Primary Examiner—Gene Wan
Attorney, Agent, or Firm—Oblon, Fisher, Spivak, McClelland, & Maier

[57] ABSTRACT

A document size detecting apparatus for a copier and others is disclosed which is capable of identifying the size of a document by use of photosensors the numbers of which is smaller than that of the kinds of documents. A scanner is loaded with a pair of photosensors, or light-sensitive elements, which are spaced from each other in a direction perpendicular to a direction in which a scanner scans a document, the photosensors sensing light which is reflected by a document. A length of a document is determined based on a distance travelled by the scanner from a document scanning start position which is in turn calculated based on a light sensing condition of one of the photosensors, while a width of the document is determined based on a light sensing condition of the other photosensor. Even if a document is placed aslant or in any other dislocated position on a glass platen, its size is identified accurately by positioning the photosensor, which is adapted for the detection of a width, offset relative to a direction which is perpendicular to a scanning direction, or by causing the two photosensors to sense at different timings, or by causing each photosensor to sense twice and deciding outputs of the photosensors valid only when the sensed conditions of the photosensors are identical individually.

12 Claims, 8 Drawing Sheets

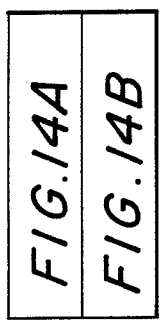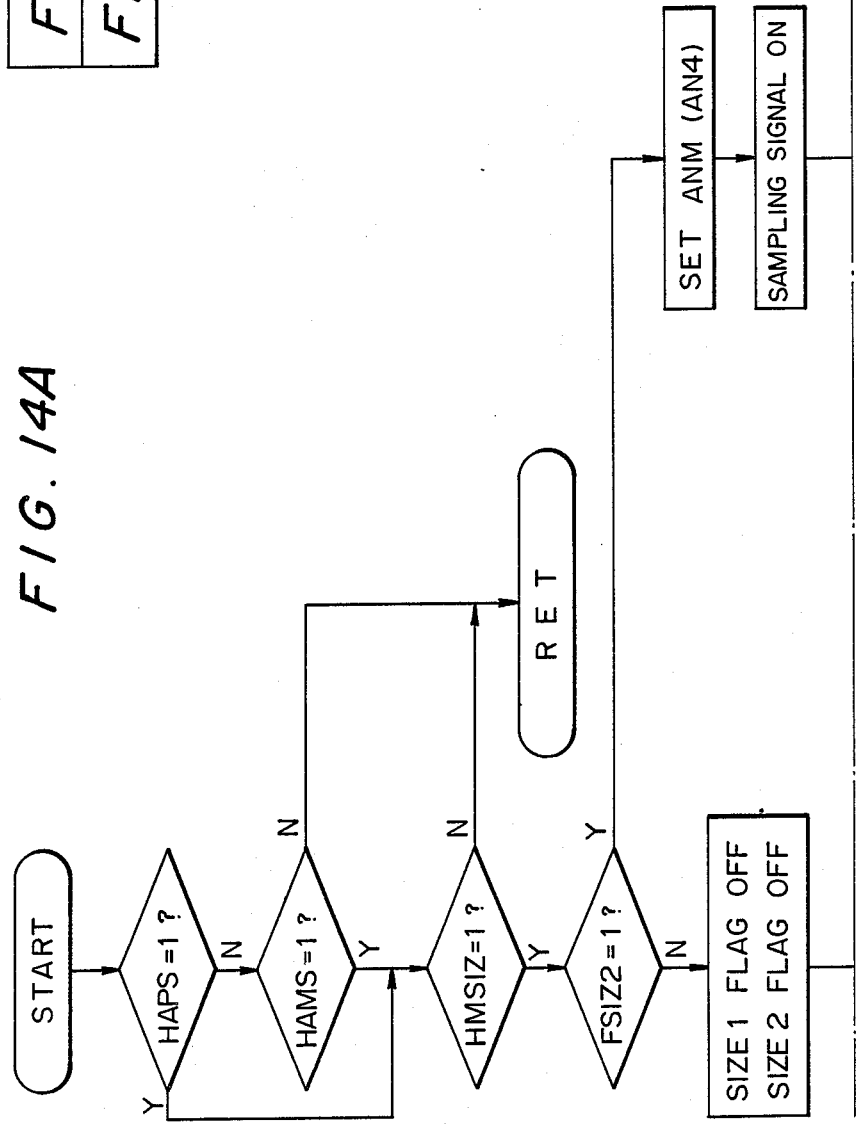

APPARATUS FOR DETECTING A DOCUMENT SIZE IN A COPIER AND OTHERS

BACKGROUND OF THE INVENTION

The present invention relates to an apparatus for detecting the size of a document in a copier and others.

In a copier, for example, it is a common practice to detect the size of a document automatically so that a magnification may be set up based on the document size. Various approaches have heretofore been proposed for the detection of a document size such as sensing light which is reflected from a document, sensing interception of light which is caused by a document, and forcing a document which is laid on a platen to cut off a conduction circuit between the platen and a document cover.

The reflection type scheme mentioned above may be accomplished by forming projections and recesses in a document cover so as to cause light reflected by a document to be propagated through a path which differs from a portion where the document is present to a portion where it is absent, i.e., document cover portion, as disclosed in Japanese Unexamined Patent Publication (Kokai) No. 53-110837. Another prior art arrangement for the reflection type scheme uses the same number of photosensors as document sizes expected. Specifically, the photosensors are arranged below a platen along the width of a document and in those positions which do not interfere with imaging operations and are close to a reference line adapted for document setting. In this kind of arrangement, when a lamp adapted to illuminate a document is turned on, those sensors to which a reflection from a document is incident are turned on, but those to which it is not incident are turned off.

A problem with the system which relies on projections and recesses in a document cover is that an extra step is required for providing the document cover with projections and recesses. The photosensor type system, on the other hand, has a drawback that the same number of photosensors as the document sizes are required and, in addition, it fails to discriminate those documents which are the same in widthwise dimension although different in size, e.g. an A3 document placed vertically long and an A4 document placed horizontally long. While accurate discrimination between documents may be enhanced by increasing the number of photosensors, such brings about not only an increase in cost but also the need for a complicated mechanism for positioning the photosensors as well as troublesome adjustment. Even if the photosensors are mounted on a scanner which serves to illuminate a document, the same number of photosensors as the document sizes are needed to bring about the same problem and, in addition, to increase the number of wirings between the photosensors and a control unit which is mounted on a copier body.

Another problematic situation with the photosensor type system is that a document is sometimes laid aslant on a platen relative to a reference position and sometimes dislocated due to air pressure when a document cover is lowered to press a document. In such a situation, output signals of the photosensors are representative of erroneous data which prevent a document size from being determined with accuracy. Then, a copier having a capability of automatically selecting a paper size based on a document size would cause images to be reproduced on those papers which do not correspond to an actual document size.

SUMMARY OF THE INVENTION

It is therefore an object of the present invention to provide a document size detecting apparatus for a copier and others which is capable of detecting a document size accurately despite a simple and inexpensive construction thereof.

It is another object of the present invention to provide a document size detecting apparatus for a copier and others which eliminates misidentification of a document size otherwise caused by dislocation and others of a document on a platen.

It is another object of the present invention to provide a generally improved document size detecting apparatus for a copier and others.

An apparatus for detecting a size of a document in response to light which is reflected by a surface of a document of the present invention comprises a light sensing device consisting of at least two light-sensitive elements which are spaced from each other by a predetermined distance in a widthwise direction of the document, which is placed accurately to be scanned, for receiving the light reflected by the surface of the document, a scanning device for scanning the document by moving the light sensing device relative to the surface of the document from a predetermined scanning start position, and a decision device for determining a length of the document by calculating a distance travelled by the light sensing device from the scanning start position in response to a condition in which one of the light-sensitive elements receives the light, determining a width of the document in response to a condition in which the other light-sensitive element receives the light, and detecting a size of the document based on the length and width determined.

The above and other objects, features and advantages of the present invention will become more apparent from the following detailed description taken with the accompanying drawings.

DESCRIPTION OF THE PREFERRED EMBODIMENTS

Figure 1:
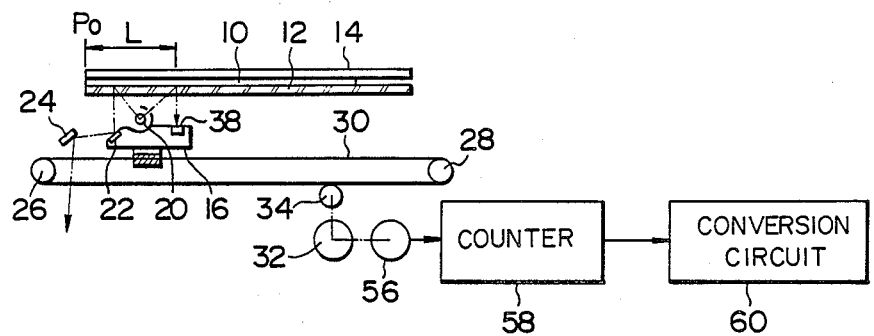
FIG. 1 is a schematic side elevation of a document size detecting apparatus in accordance with a first embodiment of the present invention.

Referring to FIGS. 1 to 4, a device in accordance with a first embodiment of the present invention is shown. As shown, a document 10 is laid on a glass platen 12 based on a reference position Po and, then, pressed by a document cover 14 from above. A scanner 16 which is loaded with a lamp 20 and a first mirror 22 is moved to sequentially illuminate the document 10. The lamp 20 is provided with a mirror 18, FIG. 3. Light reflected from the document 10 is focused onto a photoconductive element by the first mirror 22, a second mirror 24 and a lens, not shown, whereby a latent image is formed electrostatically on the photoconductive element. The scanner 16 is connected to a drive wire 30 which is passed over pulleys 26 and 28. As a drive pulley 34 is rotated by a drive motor 32, the scanner 16 scans the document 10 at a predetermined rate sequentially from the reference position Po and, then, returns to the reference position Po.

Figure 2:
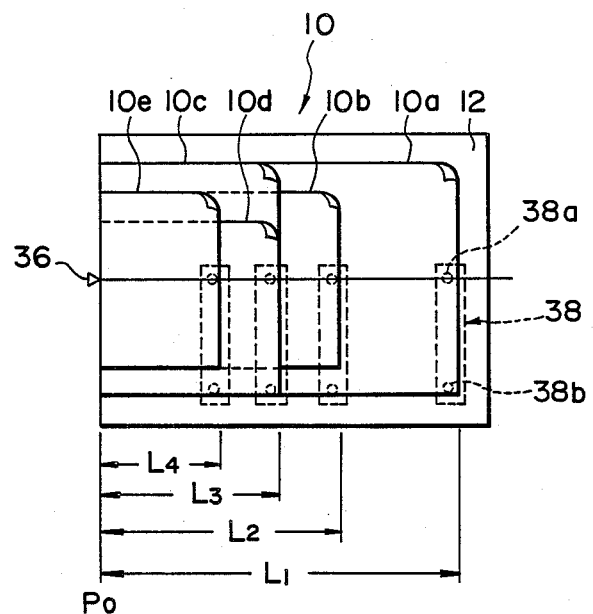
FIG. 2 is a plan view of the device of FIG. 1, showing dimensional relationships.

In this particular embodiment, as shown in FIG. 2, there is adopted a center reference scheme which causes one to position the document 10 on the glass platen 12 on the basis of a center mark 36 which is located in the reference position Po. Further, this embodiment is assumed to accommodate documents of A size series. That is, as shown in FIG. 2, the document 10 may comprise any of an A3 document 10a, an A4 document 10b which is placed vertically long, an A4 document 10c which is placed horizontally long, an A5 document 10d which is placed vertically long, and an A5 document 10e which is placed horizontally long.

The scanner 16 is loaded with a detecting device 38 which detects a document size by sensing light from the lamp 20 which is reflected by the document 10. The mirror, or reflector 18, is formed with a slot 18a, FIG. 3. The detecting device 38 comprises two photosensors 38a and 38b which serve as light-sensitive elements and may be implemented with photodiodes. The photosensors 38a and 38b are spaced from each other in the widthwise direction of the document 10. Specifically, the photosensor 38a is adapted to determine a distance travelled by the scanner 16 from the reference position Po and aligned with a center reference line, i.e. a line which passes through the center mark 36. The other photosensor 38b is adapted to determine a document width and located in a particular position where a reflection from the end of the A3 document 10a or that of the A4 document 10c which is placed horizontally long becomes incident to the photosensor 38a, but reflections from the A4 vertically long document 10b, A5 vertically long document 10d and A5 horizontally long document 10e do not.

Figure 3:
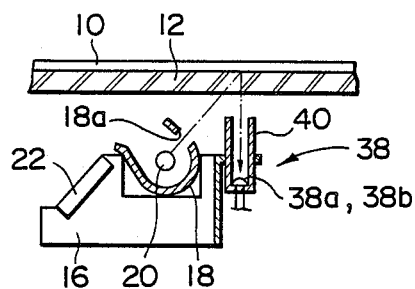
FIG. 3 is a vertically sectioned side elevation showing in an enlarged scale a scanner and its associated arrangement.
Figure 4:
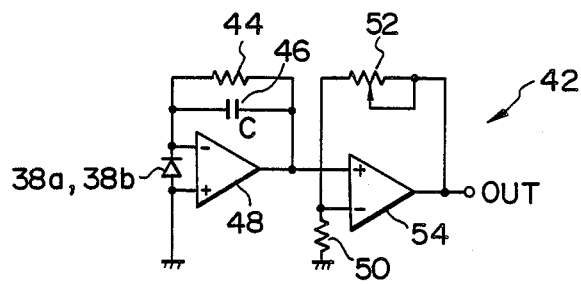
FIG. 4 is a circuit diagram.

As shown in FIG. 3, each of the photosensors 38a and 38b is received in, for example, a light intercepting tube 40 whose inner wall is painted black. This is desirable to limit the area to which a reflection from the document 10 becomes incident and, thereby, to enhance the accuracy of size detection. The output of each photosensor or photodiode 38a or 38b becomes ON when the amount of light incident thereto is greater than a reference amount and OFF when it is smaller than the reference amount. Stated another way, a condition wherein the outputs of photosensors 38a and 38b are ON is representative of presence of the document 10 (a reflection from the document 10 being incident), while a condition wherein they are OFF is representative of absence of the document 10. This is accomplished by, as shown in FIG. 4, connecting each photosensor 38a or 38b to a sensor circuit 42 comprising operational amplifiers (op amps) 48 and 54 which are interconnected in two consecutive stages. A capacitor 46 is connected to the op amp 48, and a reference resistor 50 and a variable resistor 52 are connected to the op amp 54.

Connected to the drive motor 32 are an encoder 56, a counter 58 and a conversion circuit 60. The counter 58 counts up output pulses of the encoder 56 as the drive motor 32 is rotated. The conversion circuit 80 determines a distance L travelled by the scanner 16 (and, therefore, the detecting unit 38) as measured from the reference position Po on the basis of a count of the counter 58 which has held when a change has occurred in the output of the photosensor 38a, and converts the distance L to a length of the document 10. The encoder 56, counter 58 and conversion circuit 60 may be implemented with those which are known in the art and, therefore, details thereof will not be described to avoid redundancy.

In the construction described above, the detection of a document size is performed by a prescanning stroke of the scanner 16 which occurs before the start of an actual copying operation. Specifically, the scanner 16 is moved for prescanning from the reference position Po with the lamp 20 turned on for illumination. Assume that the A4 document 10c is placed horizontally long on the glass platen 12. In this condition, a reflection from the document 10c is incident to both of the photosensors 38a and 38b at the reference position Po, so that the outputs of the photosensors 38a and 38b are ON. As the prescanning stroke of the scanner 16 proceeds, the number of output pulses of the encoder 56 increases. When the scanner 16 reaches the end of the document 10c, the outputs of the photosensors 38a and 38b become OFF since the document 10c is not present any longer. In response to the change of the output of the photosensor 38a, the counter 58 stops counting the output pulses of the encoder 56 and, then, the count existing at that instant is converted to a distance L₃ travelled by the scanner 16 (detecting unit 38) as measured from the reference position Po. Based on the distance L₃ measured, it is decided that the document 10 is either the A4 document 10c placed horizontally long or the A5 document 10d placed vertically long. Then, because the output of the photosensor 38a, too, has changed from ON to OFF, meaning that the document width is the horizontal width of an A4 document, it is decided that the document 10 is the A4 document 10c placed horizontally long.

Next, assume that it is the A5 document 10d placed horizontally long that is present on the glass platen 12. Then, as in the case with the A4 document 10c, it is determined that the document is either the A4 document 10c or the A5 document 10d upon the change of the output of the photosensor 38a from ON to OFF. The output of the photosensor 38a, on the other hand, does not change at the instant when the output of the photosensor 38a has changed, that is, it has remained OFF since the start of the prescanning stroke. Such a combination of the photosensor outputs clearly shows that the document 10 is the A5 document 10d which is placed vertically long.

As stated above, the A3 document 10a, A4 document 10b placed vertically long, A4 document 10c placed horizontally long, A5 document 10d placed vertically long and the A5 document placed horizontally long can be discriminated from each other based on the combination of the distance L travelled by the scanner 16 (detecting unit 38) which is calculated in response to a change in the output of the photosensor 38a, and the output condition of the other photosensor 38b. Specifically, assuming that distances (document lengths) $L_1$, $L_2$, $L_3$ and $L_4$ have been measured upon a change of the output of the photosensor 38a in relation to the various kinds of documents, as shown in FIG. 2, the decision is made as shown below.

| | | SIZE DECISION TABLE | |
|---|---|---|---|
| CASE | DIS-TANCE | PHOTOSENSOR 38b | SIZE DECISION |
| (1) | $L_1$ | ON | A3 DOCUMENT |
| (2) | $L_2$ | OFF | A4 DOCUMENT VERTICALLY LONG |
| (3) | $L_3$ | ON | A4 DOCUMENT HORIZONTALLY LONG |
| (4) | $L_3$ | OFF | A5 DOCUMENT VERTICALLY LONG |
| (5) | $L_4$ | OFF | A5 DOCUMENT HORIZONTALLY LONG |

In this manner, in accordance with this particular embodiment, documents of five different sizes 10a to 10e can be discriminated from each other by use of only two photosensors 38a and 38b to which a reflection from the document 10 is incident, whereby the detecting mechanism is simplified to promote the cut-down of cost.

While the embodiment of FIGS. 1 to 4 has been described in relation to documents 10 of A size series, it can accommodate documents of B size series in combination with those of A series if one photosensor which is identical with the photosensor 38b is added to sense the width of B size documents.

As regards the document size detection which relies on prescanning as described above, the scanner 16 may be returned by any of two different systems. A first system is such that the scanner 16 is caused to continue prescanning even after the detection until it reaches a predetermined maximum scanning length and, then, returned to the reference position Po to prepare for a copying operation. A second system is such that immediately after the detection (upon change of the output of the photosensor 38a from ON to OFF) the scanner 16 is stopped and returned to the reference position Po to prepare for a copying operation. The first system advantageously simplifies a scanner control arrangement, while the second system advantageously shortens a period of time necessary for the scanner 16 to complete prescanning, i.e., a period of time necessary for the detection of a document size, especially in the case with small size documents such as those of size A5.

If desired, the detection of a document size may be performed while the scanner 16 is returned from the maximum scanning position to the reference position Po. In this alternative system, a size detection command is entered on a control panel, not shown, to cause the scanner to move to the maximum scanning position and wait for the next command there. In response to the next command which may be a copy start command, for example, the scanner 16 is caused into a stroke toward the reference position Po and, during this stroke of the scanner 16, a document size is detected. In this system, the photosensors 38a and 38b are located in the same positions as in the embodiment shown and described, but the operation (ON, OFF) is reversed. Because the maximum scanning distance is predetermined (and, therefore, so is done the number of output pulses of the encoder 56 which corresponds to the maximum scanning distance), a document size (length) can be readily calculated by substracting a distance travelled by the scanner 16 from the maximum scanning distance.

Figure 5:
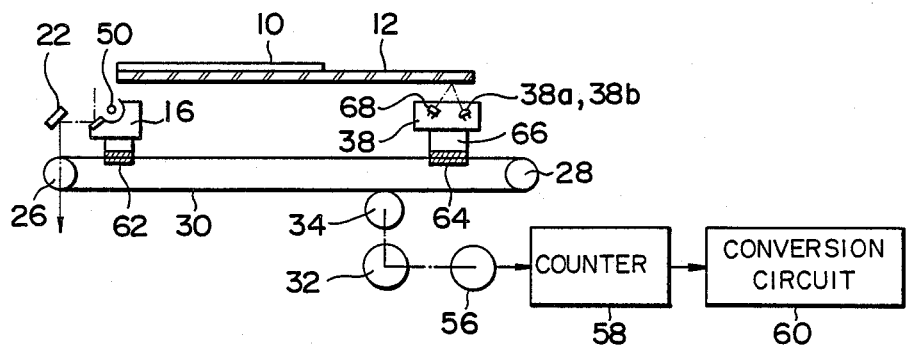
FIG. 5 is a view similar to FIG. 1, showing a second embodiment of the present invention.
Figure 6:
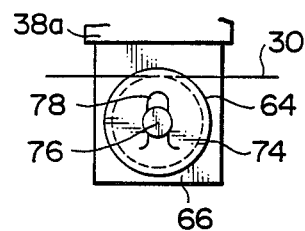
FIG. 6 is a side elevation of a connecting device.
Figure 7:
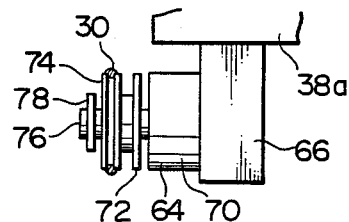
FIG. 7 is a front view of the connecting device.

Referring to FIGS. 5 to 7, a second embodiment of the present invention is shown. In these drawings, the same or similar structural elements as those shown in FIGS. 1 to 4 are designated by like reference numerals. As shown, the scanner 16 is loaded with the lamp 20 and first mirror 22 only and selectively connected to and disconnected from the drive wire 30 by a first connecting device 62. A size detecting scanner 66, which is independent of the scanner 16, is selectively connected to and disconnected from the wire 30 by a second connecting device 64. The size detecting scanner 66 is loaded with the photosensors 38a and 38b and a lamp 68 which is independent of the lamp 20, thereby constituting the detecting device 38. The scanner 66 with such a construction is located at the maximum scanning position side.

Because the first and second connecting devices 62 and 64 are identical in construction, only the second connecting device 64 will be described hereinafter with reference to FIGS. 6 and 7. The scanner 66 is provided with an electromagnetic brake armature 72 through an electromagnetic brake 70. A pulley 74 is mounted on the armature 72 and free to rotate relative to a shaft 76 on which it is mounted. An E-ring 78 serves to prevent the pulley 74 from slipping off the shaft 76.

During copying operation, the first connecting device 62 is activated to connect itself to drive wire 30 so that the scanner 16 is moved together with the wire 30. During document size detection, on the other hand, the first connecting device is deactivated to disconnect the scanner 16 from the wire 62 and, therefore, the scanner 16 remains in a halt even when the wire 62 is driven. Concerning the size detecting scanner 66, during document size detection, the scanner 66 is connected to the wire 30 by the second connecting device 64, i.e., the electromagnetic brake 70 and brake armature 72 with the result that it is moved together with the wire 30 toward the reference position Po. While the scanner 66 is moved so, the lamp 68 remains turned on to allow the photosensors 38a and 38b to detect the size of the document 10, as previously described. Upon completion of the size detection, the scanner 66 is returned to the original position and, then, the second connecting device 64 is deactivated to disconnect the scanner 66 from the wire 30. This prevents the scanner 66 from being moved during the course of copying operation although the wire 30 is driven to move the scanner 16.

An advantage attainable with the independent scanner 66 is that the photosensors 38a and 38b of the detecting device 38 which is mounted on the scanner 66 are free from the influence of heat generated by the lamp 20, whereby the characteristic of the detecting device and, therefore, the reliability of a result of detection is enhanced. In addition, because the scanner 16 is not loaded with the detecting device 38 and, therefore, light weight, the ease of the control over the starts and stops of the scanner 7 is promoted.

Figure 8:
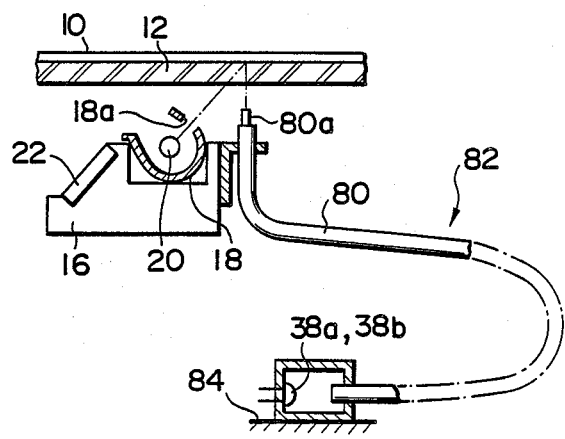
FIG. 8 is a side elevation showing a third embodiment of the present invention.

Referring to FIG. 8, a third embodiment of the present invention is shown. In this particular embodiment, a detecting device 82 is implemented with the combination of the photosensors 38a and 38b and optical fibers 80 which are assigned one-to-one to the photosensors 38a and 38b. One end of each of the optical fibers 80 is supported by the scanner 16 to serve as a light input portion 80a. Specifically, a reflection from the document 10 is introduced into the optical fiber 80 via the light input portion 80a. The photosensors 38a and 38b are each mounted on a stationary member 84 of the device and optically connected to the optical fiber 80 such that the reflection propagated through the fiber 80 enters the photosensor via the other end of the fiber 80. Again, because the scanner 16 is not loaded with the photosensors 38a and 38a, thermal influence of the lamp 20 on the photosensors 38a and 38b is eliminated so that the temperature drifts of the sensors are remarkably reduced to enhance reliable size detection.

Figure 9:
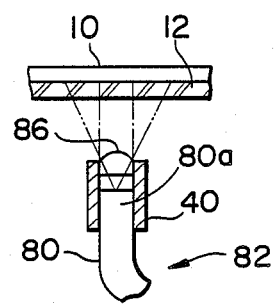
FIG. 9 is a side elevation showing a modification to the embodiment of FIG. 8.

In the embodiment which uses the optical fiber 80 as stated above, a lens 86, FIG. 9, may be disposed in the light input portion 80a of the fiber 80 in order to further enhance reliable size detection. For example, an experiment showed that when the lens 86 has an outside diameter of 3 millimeters and is positioned such that its tip is spaced 5.5 millimeters from the document 10, a document size can be detected with accuracy of 1 millimeter. Namely, document lengths the difference of which is as short as 1 millimeter can be discriminated from each other. In contrast, when the lens 86 was not used and the tip of the light input portion 80a of the fiber 80 was spaced 5.5 millimeters from the document 10, the accuracy of detection was measured to be 3 to 4 millimeters.

Figure 10:
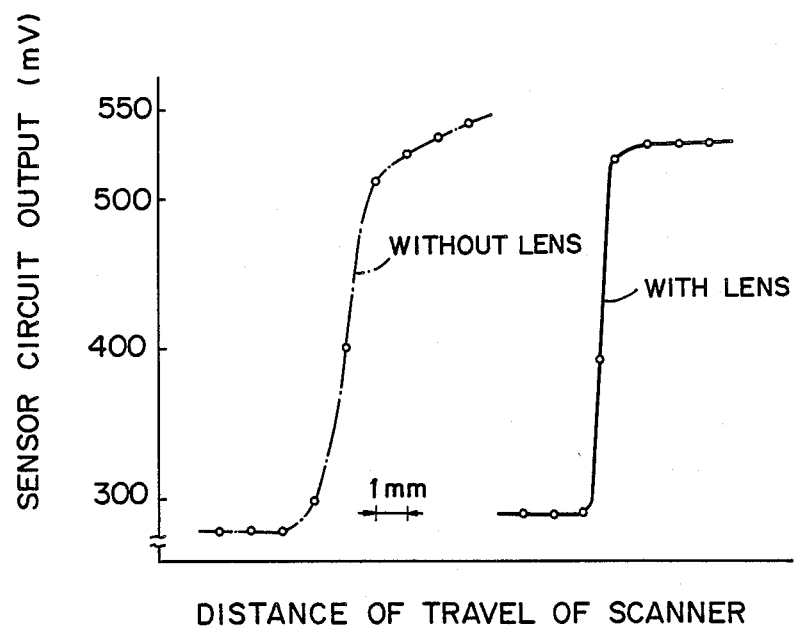
FIG. 10 is a graph showing a sensor circuit output to scanner stroke characteristic.

For the comparison in terms of detection accuracy, FIG. 10 shows curves which are representative of changes of the sensor circuit output actually measured. In FIG. 10, a solid line corresponds to the case with the lens 86, and a dash-and-dot line corresponds to the case without the lens 86. So far as the case without the lens 86 is concerned, the sensor circuit output is low in a region where the document 10 is absent since a reflection is almost zero there; it is high in a region where the document 10 is present since a reflection from the document 10 is propagated through the optical fiber 80. Here, if the change from a low output state to a high output state of the sensor circuit is rapid, even a small difference in the length of the document 10 can be detected. In this regard, it will be seen that in the case without the lens 86 the change from the low output to the high output needs a distance of 3 to 4 millimeters. In the case with the lens 86, on the other hand, the same change completes within a distance of 1 millimeter.

In this manner, by simply adding the lens 86, it is possible to achieve an extra improvement in the accuracy of document size detection. Again, the photosensors 38a and 38b are prevented from being thermally effected by the lamp 20 due to the use the optical fiber 80.

It will be needless to mention that the optical fiber type system is similarly applicable to the second embodiment as previously described.

As described above, in accordance with the present invention, various systems as represented by the first to the third embodiments may be used for the detection of a document size. In accordance with the present invention, there is also provided means for preventing a document size from being misidentified in any of the foregoing embodiments.

Figure 11A:
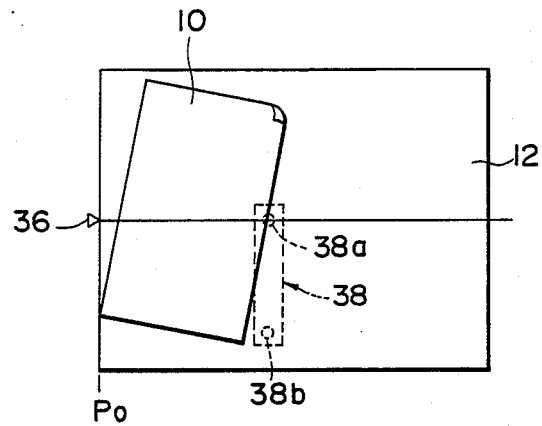
FIGS. 11A and 11B are plan views representative of different positions of a document.
Figure 11B:
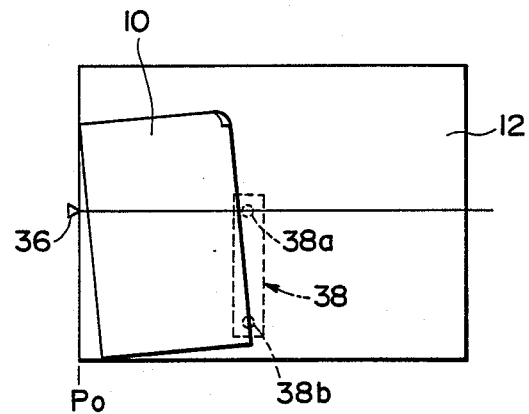

To begin with, a description will be made on situations in which misidentification of a document size occurs. As previously discussed, the document 10 should be laid accurately in the reference position Po on the glass platen 12. In practice, however, the document 10 is sometimes placed aslant relative to the reference position Po and sometimes dislocated by air pressure which is generated by a downward movement of the document cover 14, as shown in FIGS. 11A and 11B. Furthermore, it may occur that the document 10 is of the other size than standard sizes as represented by the A series and B series, or that the document 10 is partly broken.

In relation to above situations, assume that the photosensors 38a and 38b are arranged in line with each other along the same scanning line, as shown in FIGS. 11a and 11B. Then, as shown in FIG. 11A by way of example, the photosensor 38b is not ON although the photosensor 38a is ON with the result that, despite that the document 10 is wide enough to cause not only the photosensor 38a but also the photosensor 38b to become ON, the document size is misidentified based on the outputs of the photosensors 38a and 38b. This is also true with the position of the document 10 as shown in FIG. 11B. It is to be noted, however, that so far as the position of FIG. 11B is concerned, any of the various embodiments shown and described is free from misidentification since the output level of the photosensor 38b is checked after the photosensor 38a adapted for length detection has become ON.

Thus, the present invention identifies a document size correctly taking account of a position of the document 10 as well.

Hereinafter will be described some examples of the means for eliminating misidentification of a document size.

Figure 12:
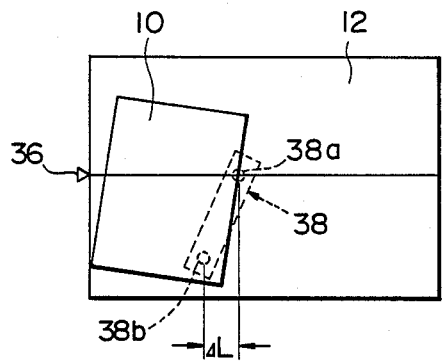
FIG. 12 is a plan view showing the operation of a first example of misidentification preventing means.

Referring to FIG. 12, a first example of the misidentification preventing means is shown in which the photosensors 38a and 38b are not in line with each other with respect to the document scanning direction. Specifically, the detecting device 38 is positioned aslant so that the photosensor 38b senses the document 10 prior to the photosensor 38a. Because the photosensor 38b is positioned below the document 10 without fail at the instant when the photosensor 38a adapted for length detection is made ON and OFF by the document 10, accurate size detection can be achieved by using data from the photosensor 38b in the event of detection by the photosensor 38a. It is to be noted that the dimension ΔL by which the photosensor 38b precedes the photosensor 38a as shown in FIG. 12 is provided with a margin with respect to possible disclocations of the document 10.

Figure 13:
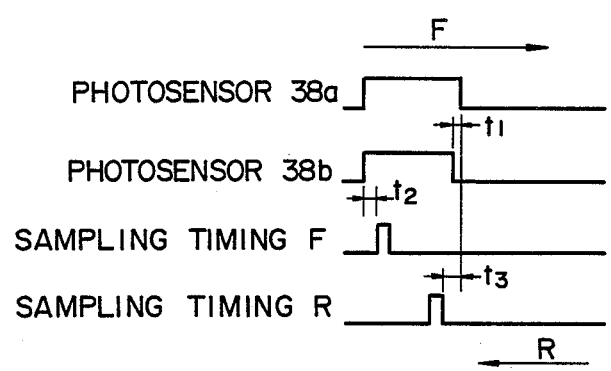
FIG. 13 is a timing chart demonstrating the operation of a second example of the misidentification preventing means.

A second example will be described with reference to FIGS. 11A and 13. In this example, while the photosensors 38a and 38b are arranged in line with each other in the scanning direction as shown in FIG. 11A, their detection timings are different from each other as shown in FIG. 13. In this case, too, assume that data from the photosensors 38a and 38b are introduced at the same timing. Then, as regards the position of the document 10 as shown in FIG. 11A, a time lag $t_1$ is developed between the output (ON/OFF) states of the photosensors 38a and 38b, as shown in FIG. 13. Consequently, if the data from the photosensor 38b is fetched at the instant when the photosensor 38a has become ON in a reading direction R, the document size will be misidentified since the photosensor 38b has not become ON yet.

In accordance with the second example of the misidentification preventing means, during scanning in a reading direction F (forward), data from the photosensor 38b is fetched at a sampling timing F which is later by a period of time $t_2$ than the timing of the start of movement of the scanner 16 away from the reference position Po. The period of time $t_2$ is free to choose within the range between the reference position and the position (time) of a minimum size of the document 10 to be detected. During scanning in the other reading direction R (reverse), data on the photosensor 38b is fetched at a sampling timing R which is later by a period of time $t_3$ than the timing at which the photosensor 38a is to sense the document 10. The period of time $t_1$ is also free to choose insofar as it is a position (time) where dislocation of the document 10 can be neglected (naturally, before the reference position Po). In this manner, misidentification of a document is eliminated with no regard to the reading direction, i.e. forward or reverse.

A third example, although a construction thereof is not shown, is as follows. The third example is implemented with store means such as memories adapted to store, respectively, output data of the photosensors 38a and 38a, comparators for comparing, respectively, the data stored in the store means with the immediately following output data of the photosensors 38a and 38b, etc. The operation of this embodiment will be described with reference FIG. 14.

Figure 14B:
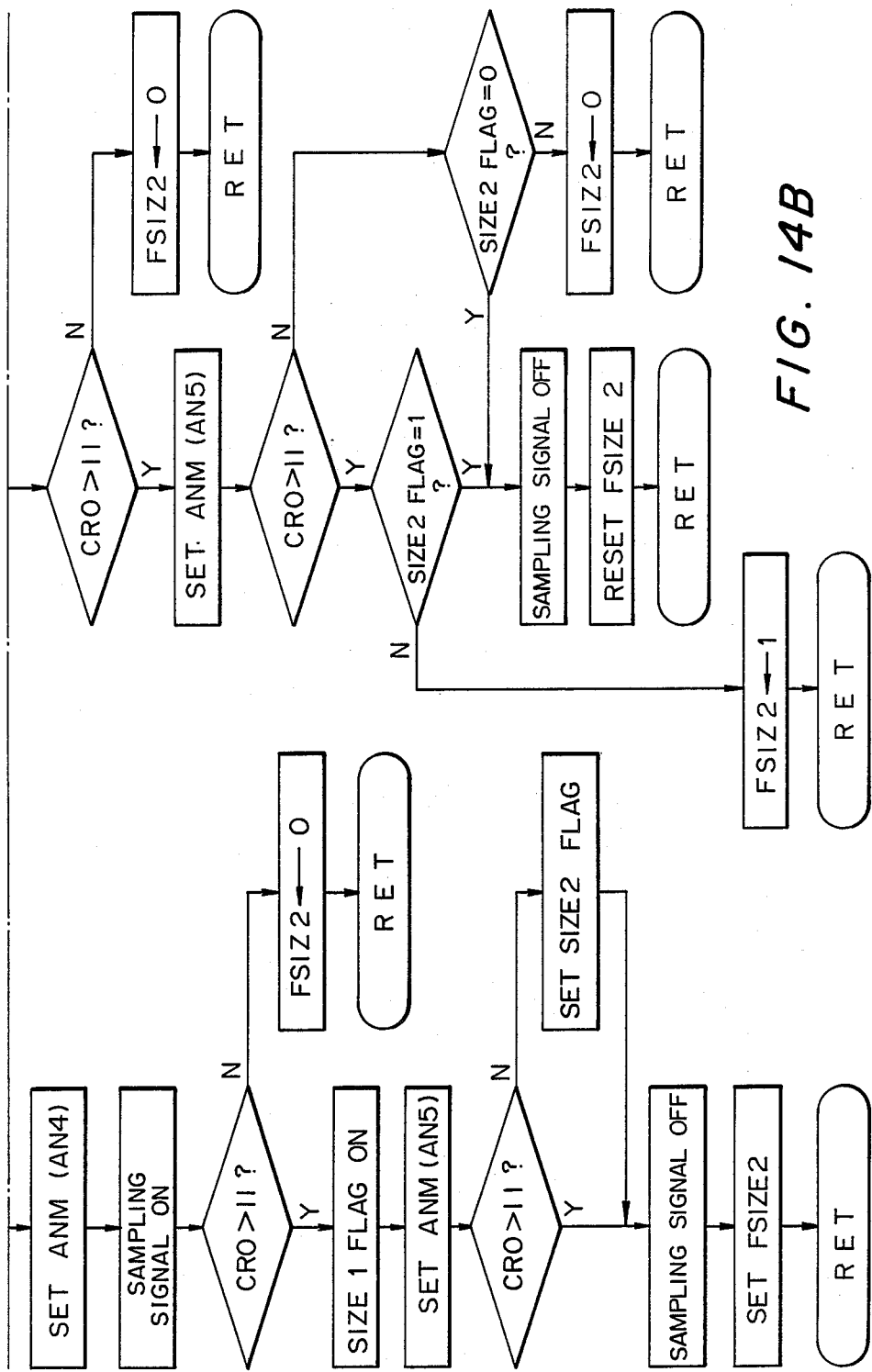
FIG. 14 is a flowchart demonstrating the operation of a control system in accordance with a third example of the misidentification preventing means.

Referring to FIG. 14, the program begins with checking the mode of the machine. In FIG. 14, HAPS is representative of an automatic paper selection mode in which papers of the same size as a document are selected automatically, while HAMS is representative of an automatic magnification mode in which the reduction ratio or the enlargement ratio of an original document is selected according to the size of papers specified. If a flag associated with any of such modes is set, an HMSIZ (document size detection start) flag adapted to check the decision of a document size detection start timing is checked. If this flag is set, an FSIZ2 flag is checked. The FSIZ2 flag is a flag which is set when data is read for the first time and reset when data is read for the second time or under a predetermined condition which will be described. Initially, the FSIZ2 flag is not set so that the program advances to the "N" side of the flow.

First, a size 1 flag and a size 2 flag which are respectively set when the data from the photosensors 38a and 38b are ON are provided. Initially, both of these flags are reset, i.e. OFF. Then, a port AN4 is selected by an ANM (analog mode register adapted to set up the mode of analog input ports of a CPU (central processing unit)) of the CPU which is included in a control circuit. Assume that data from the photosensor 38a is applied to the port AN4. This is followed by turning on a sampling signal to sample the data. When the content of a register CRO adapted to store the sampled data is greater than any desired value (11 in this example), it is determined that the document 10 is present; if it is smaller than the predetermined value, it is determined that the document 10 is absent and, then, the program returns after resetting the FSIZ2 flag.

When it is decided that the document 10 is present, the size 1 flag is set. Subsequently, as in the previous case, the ANM is so set as to read data which is applied to a port AN5 from the photosensor 38b. Again, the content of a CRO adapted to store data from the photosensor 38b is checked; if it is greater than a certain value, the size 2 flag is set and, if it is smaller than the same, the condition is left as it is. This is followed by turning off the sampling signal, resetting the FSIZ2 flag, and returning.

In the next routine, because the FSIZ2 flag is set, the processing proceeds according to the routine of "Y". Again, the processing begins with sampling data from the photosensor 38a and, then, examining the content of the CRO associated therewith. If it is smaller than a certain value, it is decided that the data from the photosensor 38a arrived last time is noise. This resets the FSIZ flag and causes the program to return. If it is greater than the certain value, the program advances to the next step deciding that the data from the photosensor 38a arrived last time is correct. The same occurs with the data which is outputted by the other photosensor 38b. Specifically, data from the photosensor 38b is fetched again and compared with data stored in the CRO associated therewith. If it is smaller than a certain value, whether the size 2 flag is zero or not is checked. If the data is greater than the certain value, whether the size 2 flag is 1 or not is decided. If each of them is coincident, the sampling signal is turned off, the FSIZ2 flag is reset, and the program returns. If they are not coincident, the program returns after turning off the sampling signal and resetting the FSIZ2 flag.

As described above, in the third example, coincidence of two consecutive data from the photosensor 38a and that of two consecutive data from the photosensor 38b are checked individually. It is only when each of the data is coincident that the FSIZ2 flag is set to make the data valid. Hence, even when the document 10 is placed aslant as shown in FIG. 11A or 11B, its size can be detected accurately to eliminate miscopying otherwise caused by size misidentification.

The third example has been shown and described on the assumption that two photosensors 38a and 38b are used and data are read twice each. When more than two photosensors are used, an arrangement may be made such that data from each of the photosensors are checked to see if they are coincident and, if the data from all the photosensors are coincident individually, a document size detected is used determining that the data are valid. In this manner, a multi-photosensor system as shown and described further enhances the accuracy of data.

In summary, it will be seen that the present invention provides a document size detecting apparatus capable of identifying a document size with photosensors the number of which is smaller than that of document sizes. This promotes simple, cost-effective and positive detection of a document size.

Furthermore, the apparatus of the present invention successfully detects a true document size with accuracy although a document may be placed aslant or otherwise dislocated.

Various modifications will become possible for those skilled in the art after receiving the teachings of the present disclosure without departing from the scope thereof.

What is claimed is:

1. An apparatus for detecting the size of a document in response to light from a single light source which is reflected by a surface of said document, comprising:

light sensing means including at least two light-sensitive elements which are spaced from each other by a predetermined distance in a widthwise direction of said document, wherein said document is placed accurately in order to be scanned, for receiving said light reflected by said surface of said document;

scanning means for scanning said document by moving said light sensing means relative to said surface of said document from a predetermined scanning start position; and decision means for determining a length of said document by calculating a distance traveled by said light sensing means from said scanning start position in response to a condition in which one of said light-sensitive elements receives said light, determining a width of said document in response to a condition in which at least one other of said at least two light-sensitive elements receives said light, and detecting a size of said document based on said length and width determined.

2. An apparatus as claimed in claim 1, wherein said light sensing means further comprises light intercepting tubes each accommodating one of said light-sensitive elements.

3. An apparatus as claimed in claim 1, wherein said scanning means comprises a scanner adapted to illuminate said document and driving means for driving said scanner, said light sensing means being mounted on said scanner.

4. An apparatus as claimed in claim 3, wherein said driving means comprises a drive motor for driving said scanner.

5. An apparatus as claimed in claim 4, wherein said decision means comprises an encoder for producing pulses which correspond to a number of rotations of said drive motor, a counter for counting said pulses, and conversion means for calculating a distance travelled from said scanning start position of said document on the basis of a number of said pulses counted and converting said distance to a length of said document.

6. An apparatus as claimed in claim 1, wherein said scanning means comprises a scanner adapted to illuminate said document, a scanner loaded with said light sensing means and independent of said scanner adapted to illuminate said document, and drive means for driving said scanners.

7. An apparatus as claimed in claim 6, wherein said drive means comprises a drive motor for moving each of said scanners.

8. An apparatus as claimed in claim 7, wherein said decision means comprises an encoder for producing pulses which correspond to a number of rotations of said drive motor, a counter for counting said pulses, and conversion means for calculating a distance travelled from said scanning start position of said document on the basis of a number of said pulses counted and converting said distance to a length of said document.

9. An apparatus as claimed in claim 1, wherein said other light-sensitive element is offset in position relative to said widthwise direction of said document which is placed accurately.

10. An apparatus for detecting the size of a document in response to light from a single light source which is reflected by a surface of said document, comprising:

light sensing means including at least two light-sensitive elements which are spaced from each other by a predetermined distance in a widthwise direction of said document, wherein said document is placed accurately in order to be scanned, for receiving said light reflected by said surface of said document;

scanning means for scanning said document by moving said light sensing means relative to said surface of said document from a predetermined scanning start position; and decision means for determining a length of said document by calculating a distance traveled by said light sensing means from said scanning start position in response to a condition in which one of said light-sensitive elements receives said light, determining a width of said document in response to a condition in which at least one other of said at least two light-sensitive elements receives said light, and detecting a size of said document based on said length and width determined wherein timings at which said light-sensitive elements sense said light are different from each other.

11. An apparatus for detecting the size of a document in response to light from a single light source which is reflected by a surface of said document, comprising:

light sensing means including at least two light-sensitive elements which are spaced from each other by a predetermined distance in a widthwise direction of said document, wherein said document is placed accurately in order to be scanned, for receiving said light reflected by said surface of said document;

scanning means for scanning said document by moving said light sensing means relative to said surface of said document from a predetermined scanning start position; and decision means for determining a length of said document by calculating a distance traveled by said light sensing means from said scanning start position in response to a condition in which one of said light-sensitive elements receives said light, determining a width of said document in response to a condition in which at least one other of said at least two light-sensitive elements receives said light, and detecting a size of said document based on said length and width determined, wherein said apparatus further includes means for respectively storing data outputted by said light-sensitive elements, and means for respectively comparing said stored data and next sensed data from said light-sensitive elements, said decision means being constructed to decide that said data outputted by said light-sensitive elements are valid only when said stored data and said next data produced by each of said light-sensitive elements are coincident.

12. An apparatus for detecting the size of a document in response to light from a single light source which is reflected by a surface of said document, comprising:

light sensing means including at least two light-sensitive elements which are spaced from each other by a predetermined distance in a widthwise direction of said document, wherein said document is placed accurately in order to be scanned, for receiving said light reflected by said surface of said document;

scanning means for scanning said document by moving said light sensing means relative to said surface of said document from a predetermined scanning start position; and decision means for determining a length of said document by calculating a distance traveled by said light sensing means from said scanning start position in response to a condition in which one of said light-sensitive elements receives said light, determining a width of said document in response to a condition in which at least one other of said at least two light-sensitive elements receives said light, and detecting a size of said document based on said length and width determined wherein timings at which said light-sensitive elements sense said light are different from each other, wherein said apparatus further comprises means for respectively storing data outputted by said light-sensitive elements, and means for respectively comparing said stored data and next sense data from said light-sensitive elements, said decision means being constructed to decide that said data outputted by said light-sensitive element are valid only when said stored data and said next data produced by each of said light-sensitive elements are coincident.

* * * * *